United States Patent
PreshaJackson et al.

(10) Patent No.: US 12,479,275 B2
(45) Date of Patent: Nov. 25, 2025

(54) RAIN GUARD SYSTEM MOUNTABLE TO A VEHICLE

(71) Applicants: Marilyn Diane PreshaJackson, Jacksonville, FL (US); Robert Lawrence Jackson, Jr., Jacksonville, FL (US)

(72) Inventors: Marilyn Diane PreshaJackson, Jacksonville, FL (US); Robert Lawrence Jackson, Jr., Jacksonville, FL (US)

( * ) Notice: Subject to any disclaimer, the term of this patent is extended or adjusted under 35 U.S.C. 154(b) by 0 days.

(21) Appl. No.: 18/732,638

(22) Filed: Jun. 4, 2024

(65) Prior Publication Data

US 2024/0424871 A1  Dec. 26, 2024

Related U.S. Application Data

(60) Provisional application No. 63/606,455, filed on Dec. 5, 2023.

(51) Int. Cl.
| | |
|---|---|
| *B60J 3/00* | (2006.01) |
| *B60J 1/20* | (2006.01) |
| *B62D 35/00* | (2006.01) |
| B62D 37/02 | (2006.01) |

(52) U.S. Cl.
CPC ............ *B60J 1/2094* (2013.01); *B60J 3/002* (2013.01); *B62D 35/005* (2013.01); *B62D 37/02* (2013.01)

(58) Field of Classification Search
CPC . B60J 3/002; B60J 1/002; B60J 1/2077; B60J 1/2005; B60J 1/2094; B60J 3/00
USPC ...... 296/95.1, 91, 154, 97.1, 97.9, 97.7, 152
See application file for complete search history.

(56) References Cited

U.S. PATENT DOCUMENTS

| | | | | | |
|---|---|---|---|---|---|
| 2,580,704 | A | * | 1/1952 | Schlagel | B60J 3/002 248/286.1 |
| 2,716,572 | A | * | 8/1955 | Soucy | B60J 1/002 160/DIG. 3 |
| 2,796,289 | A | * | 6/1957 | Tocchetto | B60J 3/002 74/502 |
| 2,853,129 | A | * | 9/1958 | Leavitt | B60J 11/08 160/370.21 |
| 3,066,972 | A | * | 12/1962 | Transue | B60J 1/002 248/206.4 |
| 3,184,264 | A | * | 5/1965 | Ealey | B60J 3/0286 160/370.21 |
| 3,424,490 | A | * | 1/1969 | Francis | B60J 3/002 160/370.21 |
| 3,481,644 | A | * | 12/1969 | Francis | B60J 1/002 160/370.21 |

(Continued)

*Primary Examiner* — Gregory A Blankenship
(74) *Attorney, Agent, or Firm* — Novel Patent Services LLC

(57) ABSTRACT

A rain guard system for a vehicle that improves driver visibility in rainy conditions. The rain guard system comprises a rain guard device and a fastening assembly. The rain guard device is affixed to a vehicle roof of the vehicle. The rain guard device is extended outward from the vehicle roof and partially covers a windshield of the vehicle to deflect rain. The rain guard device is designed to mount onto the vehicle and act as a see-through barrier to deflect rain. The rain guard device comprises a generally transparent, main body that is shaped and sized to fit over a rear area of the windshield. The rain guard device comprises an aerodynamic structure, which significantly reduces air resistance, and improves fuel efficiency and provides stability on high-speed turns.

15 Claims, 4 Drawing Sheets

(56) References Cited

U.S. PATENT DOCUMENTS

| | | | | |
|---|---|---|---|---|
| 3,650,559 A * | 3/1972 | Powers | B60J 1/002 | 160/370.21 |
| 4,726,619 A * | 2/1988 | Haugestad | B60J 3/002 | 296/95.1 |
| 5,184,866 A * | 2/1993 | Dresen | B60J 3/002 | 296/180.1 |
| 5,186,511 A * | 2/1993 | Hwang | B60J 1/20 | 296/154 |
| 5,253,829 A * | 10/1993 | Willey | B60J 7/226 | 296/217 |
| 5,348,363 A * | 9/1994 | Fink | B60J 1/2005 | 296/180.1 |
| 5,452,933 A * | 9/1995 | Stanesic | B60J 3/002 | 296/95.1 |
| 5,636,892 A * | 6/1997 | Gordon | B62D 35/005 | 296/154 |
| 5,755,483 A * | 5/1998 | Lund | B60J 1/2005 | 296/91 |
| 5,836,640 A * | 11/1998 | Hurayt | B62D 29/048 | 296/180.2 |
| 5,851,044 A * | 12/1998 | Lund | B60J 3/002 | 296/154 |
| 6,099,064 A * | 8/2000 | Lund | B60J 3/002 | 296/154 |
| 6,530,620 B1 * | 3/2003 | Turney | B62D 35/001 | 160/DIG. 3 |
| 2006/0012208 A1 * | 1/2006 | Brash | B60J 1/2005 | 296/91 |
| 2006/0091691 A1 * | 5/2006 | Drabant | B60J 3/002 | 296/95.1 |
| 2024/0424871 A1 * | 12/2024 | PreshaJackson | B60J 1/002 | |

* cited by examiner

RAIN GUARD SYSTEM MOUNTABLE TO A VEHICLE

The present disclosure relates generally to a rain guard visor for vehicles, and more particularly to a rain guard system for a vehicle that improves driver visibility in rainy conditions, thereby making driving more comfortable and safer.

BACKGROUND

Driving a vehicle is a convenient way to get around. However, when it comes to driving in the rain, this convenience is quickly compromised. Heavy raindrops falling on windshield obscure a driver's vision, while roads become slick and slippery, reducing traction and making it more difficult to control the vehicle. Further, sun often disappears behind dark clouds, adding yet another obstacle to the already challenging task of driving in the rain.

To mitigate these issues, windshield visors have been used for years. These visors extend outwards from the roof of the vehicle and provide a shield and protection for the windshield. However, the visors have many problems. Although visors provide an effective solution to protect drivers from bright sunlight and other environmental factors, their performance can be suboptimal in certain situations. Specifically, when a vehicle is moving at high speeds, the air pressure against the visor can cause it to either rip off or flutter uncontrollably. This fluttering not only creates a distraction for the driver but also puts a strain on the visor's mounting, which can eventually lead to a complete detachment. As a result, it's crucial to ensure that visors are properly installed and secured to prevent such issues from occurring.

Recent data has revealed a rather alarming fact, a significant proportion of accidents that occur due to weather conditions are linked to wet pavement and rainfall. This implies that thousands of individuals are either killed or injured every year due to such mishaps. It's crucial to note that wet roadways can reduce tire traction, leading to skids and hydroplaning, which can cause drivers to lose control of their vehicles. Moreover, rainfall can also impair visibility, making it difficult for drivers to spot obstacles and other vehicles on the road. Therefore, it's essential to exercise caution and follow road safety guidelines while driving in such weather conditions to ensure the safety of oneself and others on the road.

In view of the multiple threats posed by rain, and the adverse statistics regarding rain originated, human fatalities and injuries, society is in constant need of solutions aimed the adverse effects of rain on driving.

Therefore, there is a need for a rain guard system for a vehicle that improves driver visibility in rainy conditions and improves road safety while addressing the limitations of existing solutions.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates to a rain guard system for a vehicle. The rain guard system comprises a rain guard device and a fastening assembly.

In one embodiment, the rain guard device is affixed to a vehicle roof of the vehicle. The rain guard device is extended outward from the vehicle roof and partially covers a windshield of the vehicle. The rain guard device is configured to deflect rain. In one embodiment, the rain guard device comprises a main body for providing shielding from precipitation. The main body has at least four edges, at least two surfaces, and one or more openings. The rain guard device is transparent for maximum visibility. The rain guard device is made of a plastic material that comprises at least one of polycarbonate, acrylic, polyvinyl chloride, and polyethylene terephthalate glycol.

In some embodiments herein, the main body of the rain guard device may comprise an aerodynamic structure. The aerodynamic structure of the main body allows the vehicle to move smoothly through the air. The vehicle requires less energy to overcome the air resistance, which translates into less fuel consumption. The aerodynamic structure of the main body of the rain guard device significantly reduces air resistance, and improves fuel efficiency and provides stability on high-speed turns.

In one embodiment, the fastening assembly is configured to secure the rain guard device to the vehicle roof. The fastening assembly comprises one or more brackets, wherein each bracket has at least one hole. The fastening assembly comprises one or more fasteners that are configured to mechanically secure the holes of the brackets to corresponding openings in the main body of the rain guard device. In one embodiment, each fastener has a head, a bolt attached to the head, and a nut that screws onto the bolt. The nut is configured to be tightened for precise adjustment of a distance between the main body and the vehicle roof, wherein the distance varies from 1 inch to 2 inches.

The fastening assembly comprises an adhesive material that is disposed between at least one of the brackets and the vehicle roof, thereby firmly attaching the rain guard device onto the vehicle roof. In one embodiment, the adhesive material includes at least one of a glue, a fabric glue, an adhesive tape, and a hot glue. The adhesive material is configured to attach the head of each fastener on the vehicle roof.

An embodiment of the first aspect wherein a method for assembling the rain guard system on the vehicle. The method comprises, providing the rain guard device. The method further comprises, securing the rain guard device to the vehicle roof of the vehicle through the fastening assembly. In one embodiment, for securing the rain guard device to the vehicle roof, the brackets are attached to the rain guard device, wherein each bracket has at least one hole. Next, the brackets are fastened to the vehicle roof through the fasteners. Later, the adhesive material is applied between the brackets and the vehicle roof for attaching the rain guard device to the vehicle roof of the vehicle. The method further comprises, adjusting the distance between the rain guard device and the vehicle roof While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1:
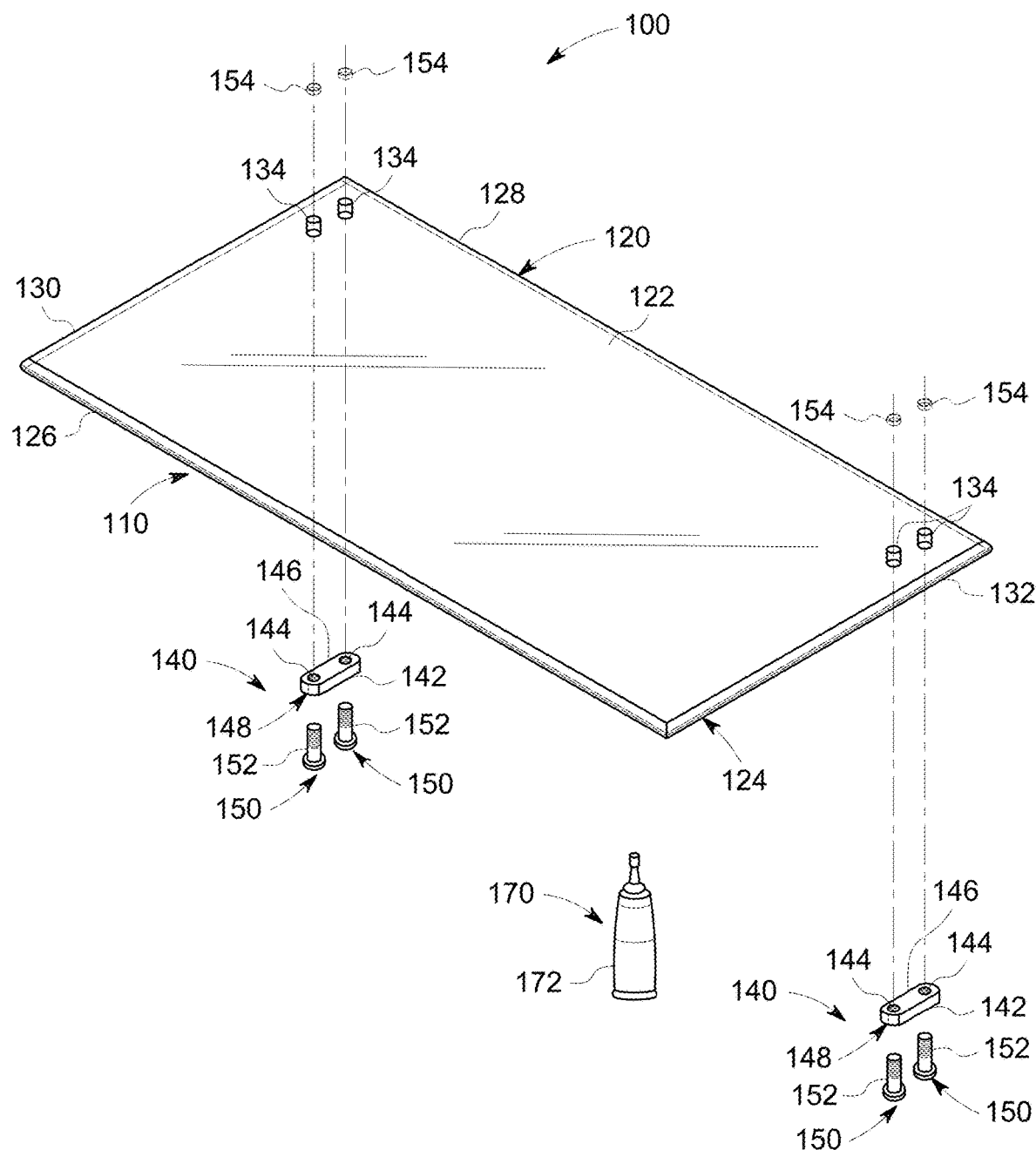
FIG. 1 illustrates an exploded top, front isometric view of a rain guard system, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

Figure 4:
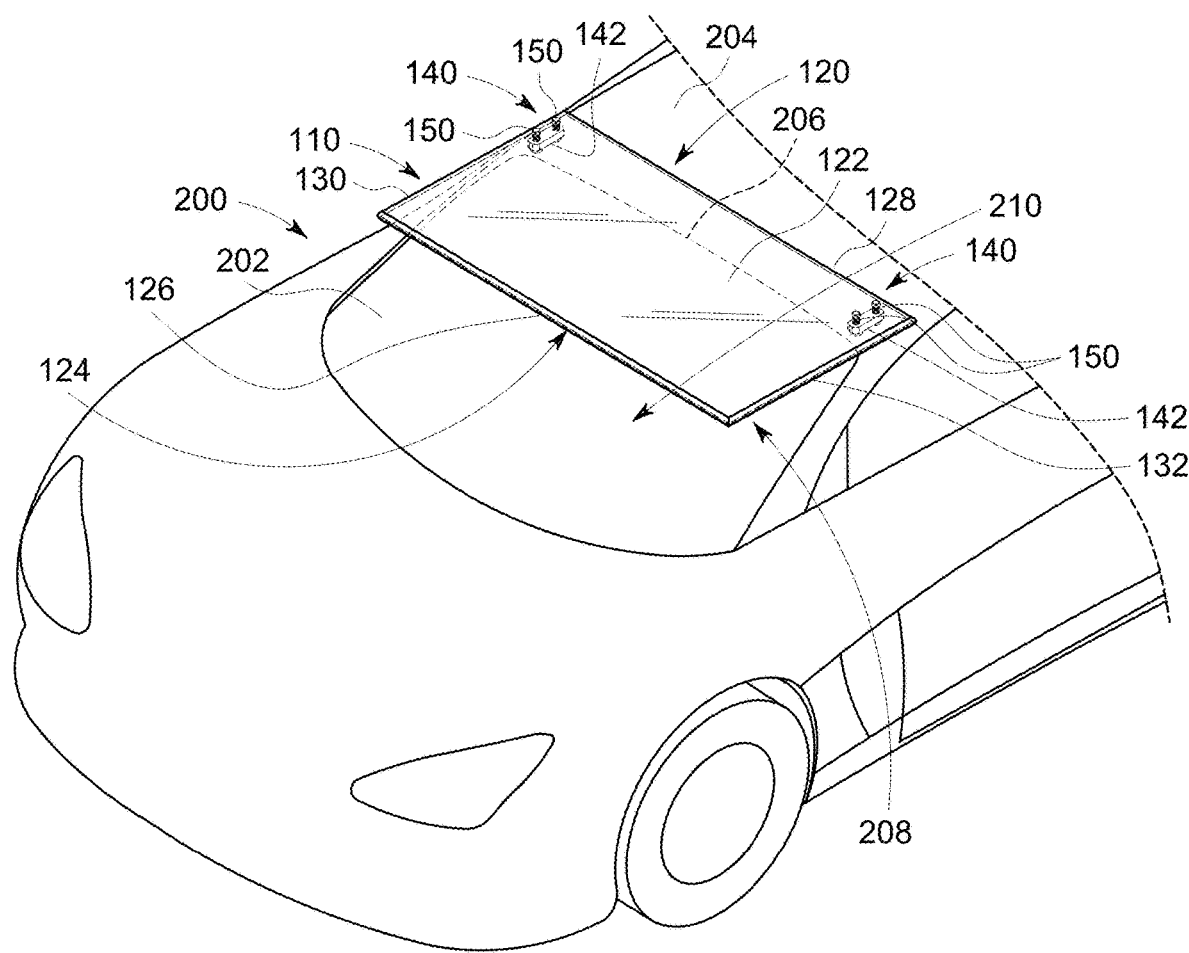
FIG. 4 illustrates a top, front isometric view of the rain guard device of the rain guard system, in accordance with embodiments of the invention.
Figure 5:
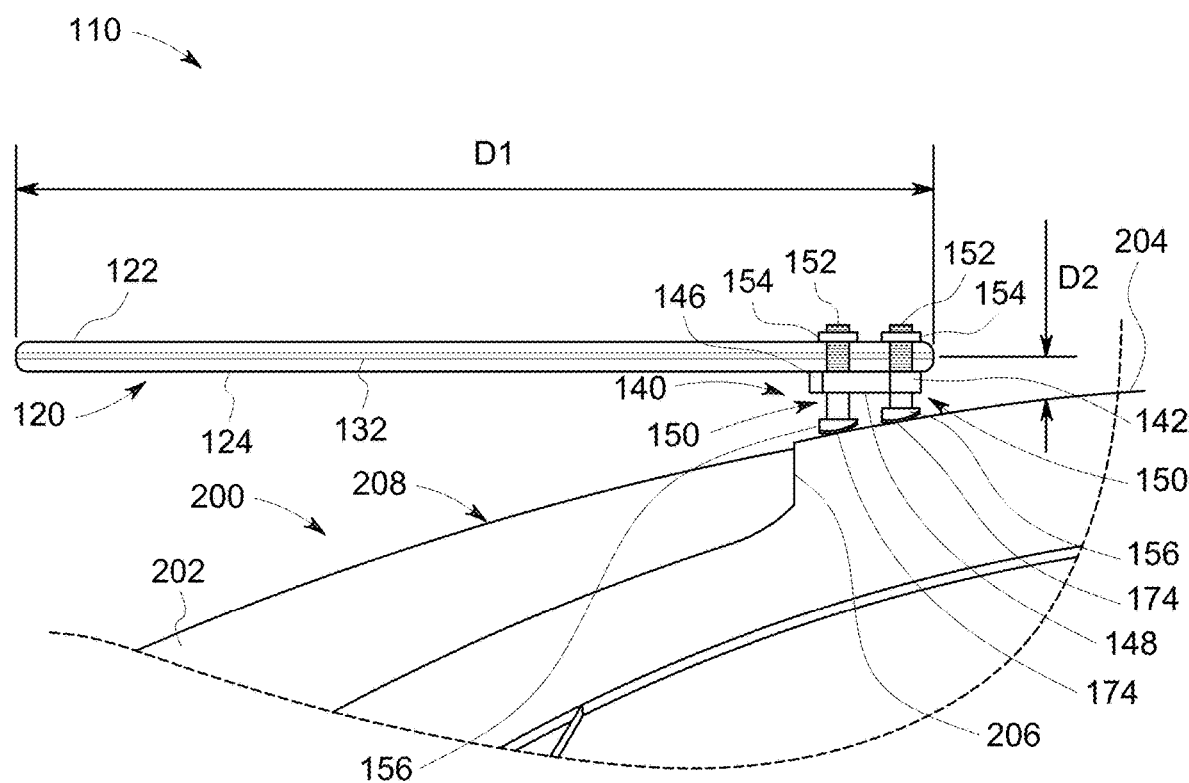
FIG. 5 illustrates a side elevation view of the rain guard device and vehicle, in accordance with embodiments of the invention.

FIG. 1 refers to an exploded view of a rain guard system 100 for a vehicle 200. The rain guard system 100 is mounted over a windshield 202 of the vehicle 200, as shown in FIGS. 4-5. The rain guard system 100 is configured to at least partially cover the windshield 202 to block rain from falling onto the windshield 202. The rain guard system 100 comprises a rain guard device 110 and a fastening assembly 140. In one embodiment, the rain guard device 110 is affixed to a vehicle roof 204 of the vehicle 200. The rain guard device 110 is extended outward from the vehicle roof 204 and partially covers the windshield 202 of the vehicle 200. The rain guard device 110 is configured to deflect rain.

In one embodiment, the rain guard device 110 comprises a main body 120. The main body 120 of the rain guard device 110 is configured to serve as a barrier, protecting the windshield 202 from rain and other precipitation.

The main body 120 has at least two surfaces (122, 124), at least four edges (126, 128, 130, 132), and one or more openings 134. The rain guard device 110 is transparent for maximum visibility. The rain guard device 110 is made of a plastic material that comprises, but is not limited to, polycarbonate, acrylic, polyvinyl chloride, and polyethylene terephthalate glycol.

In another embodiment, the main body 120 has various properties such as rigidity, planarity, and transparency. These properties can be present individually or in combination. For instance, the current embodiment showcases a main body 120 that is simultaneously rigid, flat, and transparent. Commonly used materials for such a configuration include transparent plastics, like acrylic, offering a balance between affordability and weight for the rain guard device 110.

In one embodiment, the main body 120 has at least two surfaces (122, 124), at least four edges (126, 128, 130, 132), and one or more openings 134. The main body 120 may include a top surface 122 and a bottom surface 124. In one embodiment herein, the main body 120 is in a flat or planar configuration, wherein the top surface 122 and the bottom surface 124 are formed along parallel planes.

In another embodiment, the rain guard device 110 is designed to mount onto the vehicle 200 and act as a see-through barrier to deflect rain. The rain guard device 110 comprises a generally transparent, main body 120 that is shaped and sized to fit over a rear area of the windshield 202. Additionally, the rain guard device 110 may include one or more fastener assemblies 140 that are used to secure the main body 120 onto the vehicle 200, ensuring that the main body 120 extends over at least the rear area of the windshield 202.

In some embodiments, main body 120 adopts a rectangular configuration. This rectangular geometry is defined by four outwardly directed edges (126, 128, 130, 132) arranged in a quadrilateral manner. Alternatively, the rectangular shape can be described by a front edge 126 and a rear edge 128 exhibiting parallel straightness. Notably, these front and rear edges (126, 128) are oriented in a left-to-right or transverse direction, denoted as y. The rectangular configuration of the main body 120 is further defined by a left-side edge 130 and a right-side edge 132. These edges are perpendicular to both the front edge 126 and the rear edge 128, extending along the front-to-back direction, denoted as x. Both the top surface 122 and the bottom surface 124 originate from these outwardly directed edges (126, 128, 130, 132). In some embodiments, the main body 120 may deviate from the rectangular form, employing a different number and/or configuration of outer edges.

In one embodiment, the main body 120 may include a plurality of openings 134. In preferred embodiments, at least one opening 134 positioned on or adjacent to the left-side edge 130 and another opening 134 is positioned on or adjacent to the right-side edge 132. As an illustrative example, the current embodiment features two pairs of openings 134. The first pair is strategically placed near the confluence of the left-side edge 130 and the rear edge 128 of the main body 120, more specifically, close to the rear left corner formed by the intersection of these two edges. Similarly, the second pair of openings 134 resides near the junction of the right-side edge 132 and the rear edge 128, specifically close to the rear right corner formed by their intersection.

Each opening 134 penetrates entirely through the main body 120, extending from the top surface 122 to the bottom surface 124. These openings 134 are each defined by a specific axial direction. In embodiment herein, the axial direction of the openings 134 aligns with the vertical direction, denoted as z. This z-axis is perpendicular to both the front-to-back direction x and the left-to-right or transverse direction y. In essence, directions x, y, and z form an orthogonal set of axes. Consequently, the top surface 122 and the bottom surface 124 reside in parallel planes defined by the x-y plane. These planes are perpendicular to the axial direction z of the openings 134.

In one embodiment, the fastening assembly 140 is configured to secure the rain guard device 110 to the vehicle roof 204. The fastening assembly 140 comprises one or more brackets 142, wherein each bracket 142 has at least one hole 144. The fastening assembly 140 comprises one or more fasteners 150 that are configured to mechanically secure the holes 144 of the brackets 142 to corresponding openings 134 in the main body 120 of the rain guard device 110.

In one embodiment, each fastener 150 has a head 156, a bolt 152 attached to the head 156, and a nut 154 that screws onto the bolt 152. The nut 154 is configured to be tightened for precise adjustment of a distance (D2) between the rear edge 128 of the main body 120 and the vehicle roof 204, wherein the distance varies from 1 inch to 2 inches.

In one embodiment, the rain guard system 100 is designed to enhance the vehicle's aerodynamic performance and maintain optimal driver visibility during travel. This is achieved by incorporating a precisely controlled gap (D2), typically ranging from 1 to 2 inches, between the vehicle roof 204 and the installed rain guard device 110. This configuration optimizes airflow over the vehicle 200, potentially leading to improved overall efficiency for the vehicle 200. In some embodiments herein, the main body 120 of the rain guard device 110 may comprise an aerodynamic structure. The aerodynamic structure of the main body 120 allows the vehicle 200 to move smoothly through the air. The vehicle 200 requires less energy to overcome the air resistance, which translates into less fuel consumption. The aerodynamic structure of the main body 120 of the rain guard device 110 significantly reduces air resistance, and improves fuel efficiency and provides stability on high-speed turns.

The fastening assembly 140 comprises an adhesive material 174 that is disposed between at least one of the brackets 142 and the vehicle roof 204, thereby firmly attaching the rain guard device 110 onto the vehicle roof 204. In one embodiment, the adhesive material 174 includes at least one of, but not limited to, a glue, a fabric glue, an adhesive tape, and a hot glue. The adhesive material 174 is configured to attach the head 156 of each fastener 150 on the vehicle roof 204.

In another embodiment, the rain guard system 100 may include the adhesive material 174 for securing the fastener assembly 140 to the vehicle 200.

Figure 2:
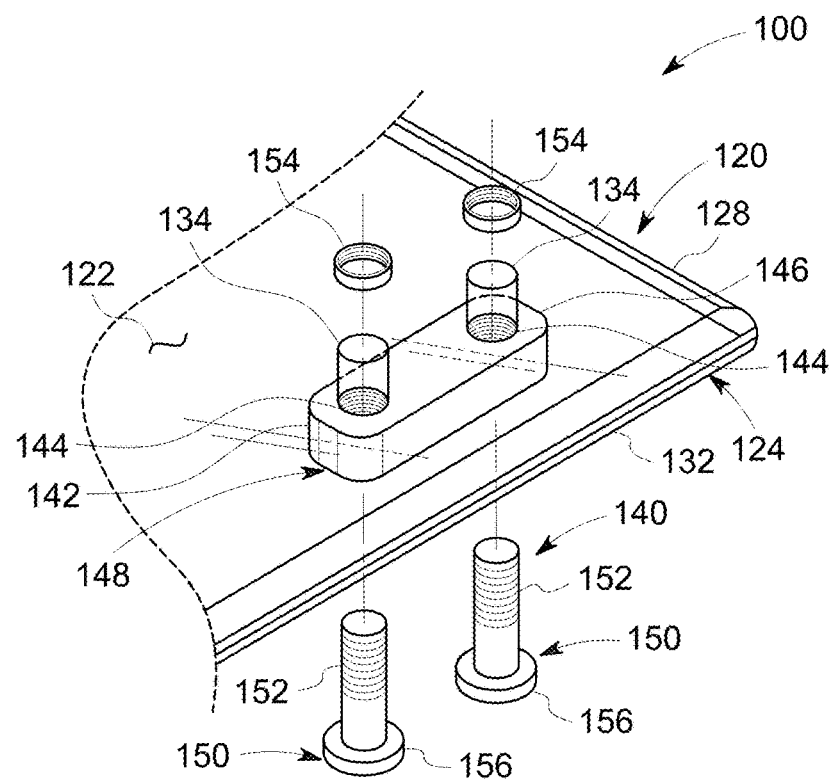
FIG. 2 illustrates an enlarged, top front isometric view of a rear right corner of a main body of a rain guard device of the rain guard system, in accordance with embodiments of the invention.
Figure 3:
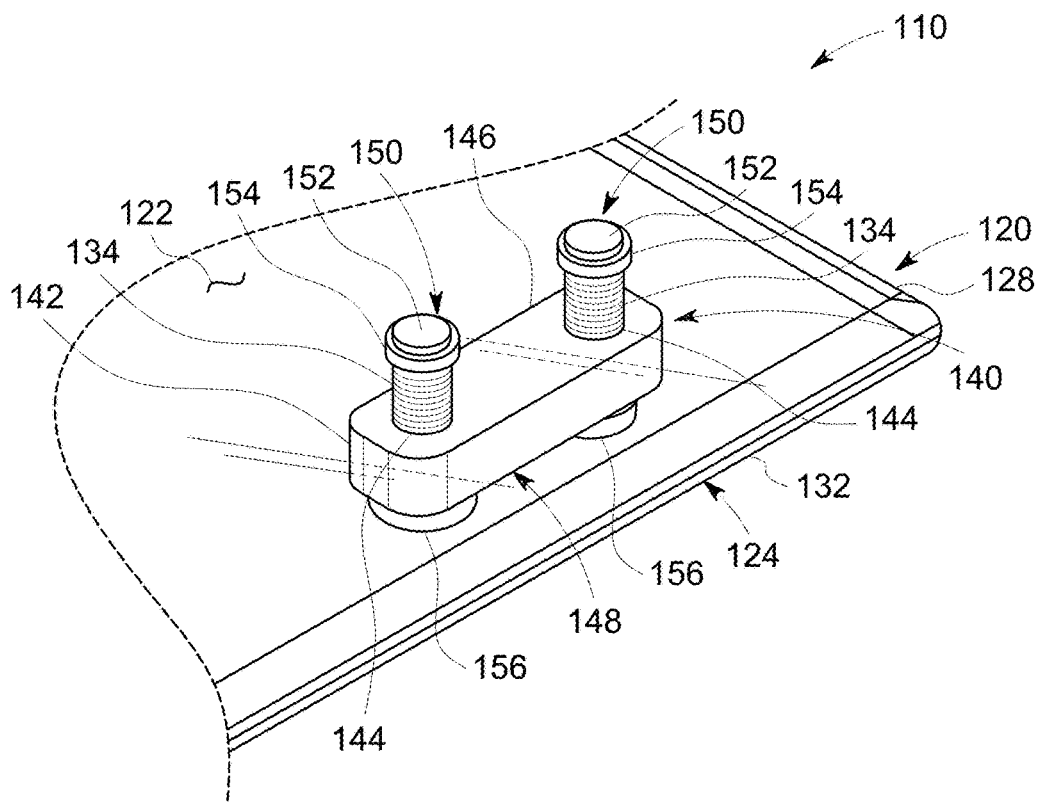
FIG. 3 illustrates another enlarged, top front isometric view of the rear right corner of the main body, in accordance with embodiments of the invention.

FIGS. 2 and 3 refer to an enlarged, top-front isometric view of a rear right corner of the main body 120 of the rain guard device 100. The brackets 142 are designed to facilitate a connection between the vehicle 200 and the main body 120. In some embodiment, the brackets 142 has a low visual profile when installed on the vehicle 200. This can be achieved through two primary methods. In one embodiment, the brackets 142 are made from transparent or clear materials such as polycarbonate, acrylic, polyvinyl chloride, and polyethylene terephthalate glycol, minimizing their visual impact. Alternatively, the brackets 142 can be made in a colour that matches the vehicle roof 204 or another designated mounting area of the vehicle 200. This approach fosters a visually cohesive appearance.

In one embodiment herein, the fastening assembly 140 consist of two brackets 142. Each bracket 142 incorporates one or more through holes 144. In a preferred embodiment, each bracket 142 embodies a pair of through holes 144 that traverse entirely through the bracket 142, extending from a top surface 146 to a bottom surface 148 of the bracket 142. The geometric configuration, specifically the size and shape, of the through holes 144 within each bracket 142 is designed to achieve precise alignment with a corresponding pair of openings 134 of the main body 120. This alignment plays a crucial role in achieving functionality which will be elaborated upon in a subsequent section.

In some embodiments, the top surface 146 of each bracket 142 is designed to create a stable abutment against the bottom surface 124 of the main body 120, specifically in the vicinity of the openings 134. For instance, in one embodiment herein, both the top surface 146 of the bracket 142 and the bottom surface 124 of the main body 120 exhibit a generally planar configuration. In some embodiments, the bottom surface 148 of the bracket 142 also adopts a planar configuration, remaining parallel to the top surface 146. In some embodiments, the bottom side 148 and/or other sides of the bracket 142 may be shaped and sized to conform to an outer contour of the vehicle 200.

In one embodiment herein, each fastener 150 is comprised of a threaded rod, stud, or bolt 152, and a corresponding nut 154, which is specifically designed to thread onto the bolt 152. The bolt 152 of each fastener 150 is inserted into a designated opening 134 of the main body 120, as well as a specific through hole 144 of one of the brackets 142, to provide secure attachment. The nuts 154 are shaped and sized in a manner that precludes them from passing through the openings 134 of the main body 120, thus ensuring that they remain firmly attached to the respective bolts 152. The precision engineering of the main body 120 and the brackets 142 ensures that the fasteners 150 are securely held in place, providing a robust and reliable connection that can withstand significant loads and stresses.

In some embodiments, the dimensional and geometric characteristics of some or all components within the rain guard device 110 can be adapted to ensure compatibility with various vehicle models. This customization can be achieved through modifications to the main body 120.

Referring to FIGS. 2-5, an embodiment of the first aspect wherein a method for assembling the rain guard system 100 on the vehicle 200. The method comprises, providing the rain guard device 110. The method further comprises, securing the rain guard device 110 to the vehicle roof 204 of the vehicle 200 through the fastening assembly 140. In one embodiment, for securing the rain guard device 110 to the vehicle roof 204, the brackets 142 are attached to the rain guard device 110, wherein each bracket 142 has at least one hole 144. Next, the brackets 142 are fastened to the vehicle roof 204 through the fasteners 150. Later, the adhesive material 174 is applied between the brackets 142 and the vehicle roof 204 for attaching the rain guard device 110 to the vehicle roof 204 of the vehicle 200. The method further comprises, adjusting the distance D2 between the rain guard device 110 and the vehicle roof 204.

In one embodiment, the bolts 152 of the fastener assembly 140 are initially secured directly to the vehicle 200 utilizing the adhesive material 174. As depicted in FIG. 1, the adhesive material 174 is dispensed from an adhesive container 172. The adhesive material 174 is configured for adhering the head 156 of each bolt 152 to a designated area on the vehicle 200. This designated area is typically located on the vehicle roof 204 in close proximity to the windshield 202. Alternatively, other suitable locations adjacent to the windshield can be chosen. The application of the adhesive material 174 ensures that the bolts 152 protrude upwards from the vehicle surface, specifically in the vertical direction (z-axis). This upward orientation is crucial for subsequent steps in the assembly process.

In some embodiments, the rain guard system 100 is designed to protect vehicles from rain and other elements. The rain guard system 100 includes an adhesive 170 that is specifically configured to securely attach the rain guard device 110 to the vehicle 200. The adhesive 170 is provided in the adhesive container 172, which usually takes the form of a tube, and contains the adhesive material 174 that is suitable for use in exterior automotive applications.

In some embodiments, the rain guard system 100 may be provided as a kit that is specifically designed to be retrofitted to an existing vehicle. This kit may be presented as an aftermarket accessory for cars and trucks, allowing owners to easily and affordably upgrade their vehicles to include this valuable feature.

Referring to FIGS. 4 and 5, the bolts 152 are positioned on the vehicle 200 in a rearward direction relative to the windshield 202, i.e. the bolts 152 are secured to the vehicle 200 and protrude upwardly from the vehicle 200. This placement strategy is crucial for proper functionality of the rain guard device 110. The positioning of the bolts 152 along the vehicle 200 adheres to a specific geometric configuration. This geometric configuration is meticulously designed to correspond exactly with the geometric arrangement of the openings 134 of the main body 120 of the rain guard device 110. This precise alignment is necessary to prepare the bolts 152 for successful insertion into their corresponding openings 134 during later assembly stages.

In some embodiments, the bolts 152 are grouped in two distinct pairs. These pairs of bolts 152 are positioned on opposing left and right sides of the vehicle roof 204 or another designated area adjacent to the windshield 202. This mirrored arrangement directly reflects the distribution of the openings 134 within the main body 120.

Referring to FIG. 2, once the bolts 152 are positioned on the vehicle 200, each bracket 142 is strategically positioned over and onto a corresponding bolt 152. This is achieved by inserting each bolt 152 through its designated through hole 144 within the corresponding bracket 142. The design ensures the bolt 152 protrudes upwards from the through hole 144 for proper alignment. The main body 120 is then carefully positioned over the brackets 142. During this step, meticulous attention is paid to ensure precise alignment. The openings 134 of the main body 120 must align perfectly with both the through holes 144 of the brackets 142 and the bolts 152 protruding from them. Once proper alignment is achieved, the main body 120 is carefully fitted over the protruding bolts 152. This manoeuvre guides each bolt 152 into its corresponding opening 134 within the main body 120. The main body 120 is then gently lowered until the bolts 152 protrude both upwards and outwards from the openings 134. Finally, a corresponding nut 154 is threaded onto each protruding bolt 152. Tightening these nuts 154 firmly secures the main body 120 to the vehicle 200, completing the rain guard device 110 assembly.

Referring to FIGS. 3 and 5, in a mounted configuration of the rain guard device 110, the nuts 154 occupy the topmost position, resting securely against the top surface 122 of the main body 120. The main body 120 forms the central layer, situated between the nuts 154 above and the brackets 142 below. The brackets 142 reside in the lowest position, directly contacting the heads 156 of the bolts 152 which are secured to the vehicle 200. Within this mounted configuration, the nuts 154 serve an adjustment function. By tightening or loosening nuts 154, the distance D2 between the main body 120 and the vehicle roof 204 can be precisely controlled. This adjustable spacing allows for fine-tuning during the installation process. As a non-limiting example, a typical distance D2 might be approximately 2 inches.

In some embodiments, within the mounted configuration of the rain guard device 110, the brackets 142 exhibit varying contact points depending on the specific embodiment. As illustrated in FIG. 5, the top surface 146 of the bracket 142 establishes a direct abutment with the bottom surface 124 of the main body 120. This configuration ensures a secure and stable connection between these two components. Conversely, FIG. 3 depicts the bottom surface 148 of the bracket 142 abutting against, or resting upon, the heads 156 of the bolts 152. This design choice may be employed for specific functional or aesthetic purposes.

In some embodiments, the bottom surface 148 of the bracket 142 may directly contact the vehicle roof 204 or another designated area on the vehicle 200. As previously mentioned, these brackets 142 are often designed with the ability to conform to the specific shape and size of the designated contact area on the vehicle 200, such as the roof 204.

Referring to FIGS. 4 and 5, in the mounted configuration, the main body 120 of the rain guard device 110 can extend over at least a portion of the windshield 202. In one embodiment herein, the main body 120 extends from a region behind the windshield 202, over a rear edge 206, and further onto a rearward area 208 of the windshield 202 positioned forward of the rear edge 206. As illustrated in FIG. 4, some embodiments may have the main body 120 shaped and sized to exclude a lower, forward area 210 of the windshield 202. The forward area 210 is positioned in front of the rearward area 208. For example, in certain embodiments, the main body 120 front-to-back dimension (dimension along the x-axis, representing the front-to-back direction) can be designed such that the main body 120 protrudes forward from the rear edge 206 of the windshield 202 by approximately 30 inches.

When mounted, the rain guard device 110 acts as a barrier between rain and the windshield 202. This barrier deflects raindrops, thereby reducing the amount of rain impacting the windshield 202 and minimizing the potential for a blurred view. The main body 120 of the rain guard device 110 remains separated from the windshield 202 during operation, ensuring that windshield wipers can function normally without any hindrance from the rain guard device 110. Consequently, the rain guard device 110 provides an effective solution by maintaining a clear view for the driver and passenger during rainy conditions.

In one embodiment, when the rain guard device 110 is no longer necessary or intended to use, the main body 120 can be disassembled from the vehicle 200 with case and speed. A user can unthread the nuts 154, detach the main body 120 from the bolts 152, and remove the main body 120 from the vehicle 200 for storage or transportation purposes. Afterward, the user may opt to thread the nuts 154 back onto the bolts 152 protruding from the brackets 142 or remove the brackets 142 and thread the nuts 154 back onto the bolts 152. Alternatively, the user may remove both the nuts 154 and the brackets 142 from the bolts 152, leaving only the bolts 152 attached to the vehicle 200. The rain guard system 100 is a practical solution that enhances driver and passenger safety during rainy weather conditions by increasing visibility. It is easy to install and remove, and can be made available in a variety of sizes and shapes in a cost-effective manner In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

What is claimed is:

1. A rain guard system for a vehicle, comprising:
   a rain guard device affixed to a roof of the vehicle, wherein the rain guard device is extended outward from the vehicle roof and partially covering a windshield of the vehicle to deflect rain, thereby enabling maximum visibility to a driver of the vehicle wherein the rain guard device is transparent; and
   a fastening assembly comprising an adhesive material that is disposed between at least one rigid bracket and the vehicle roof, the fastening assembly being configured to removably secure the rain guard device to the vehicle roof.

2. The rain guard system of claim 1, wherein the rain guard device comprises a main body in a flat or planar configuration for shielding from precipitation, wherein the main body has at least four peripheral edges, at least two surfaces including a top surface and a bottom surface arranged along parallel planes, and one or more through-openings spaced along at least one edge for mechanical coupling to the brackets.

3. The rain guard system of claim 1, wherein the fastening assembly further comprises:
   one or more rigid brackets, wherein each bracket having at least one hole;
   one or more fasteners configured to mechanically secure the one or more holes of the one or more brackets to corresponding openings in the main body of the rain guard device;
   wherein each fastener has a head, a bolt attached to the head, and a nut that screws onto the bolt, the head adhered to the vehicle roof using the adhesive material.

4. The rain guard system of claim 3, wherein the adhesive material includes at least one of a glue, a fabric glue, an adhesive tape, and a hot glue.

5. The rain guard system of claim 3, wherein the each fastener is configured to be tightened for precise adjustment of a distance between a rear edge of the main body and the vehicle roof, the distance being adjustable within a range of 1-2 inches.

6. The rain guard system of claim 1, wherein the rain guard device comprises an aerodynamic structure, which significantly reduces air resistance, and improves fuel efficiency and provides stability on high-speed turns.

7. The rain guard system of claim 1, wherein the rain guard device is made of a material comprises at least one of polycarbonate, acrylic, polyvinyl chloride, and polyethylene terephthalate glycol.

8. A rain guard system for a vehicle, comprising:
   a rain guard device having a main body in a flat or planar configuration for shielding from precipitation, wherein the main body has at least four edges, at least two surfaces including a top surface and a bottom surface arranged along parallel planes, and one or more through-openings, wherein the main body is affixed to a roof of the vehicle, and is extended outward from the vehicle roof to partially cover a windshield of the vehicle, wherein the rain guard device is transparent to enable maximum visibility to a driver of the vehicle;
   one or more brackets, wherein each bracket having at least one hole for receiving a fastener, wherein each fastener is configured to mechanically secure the one or more holes of the one or more brackets to corresponding openings in the main body of the rain guard device;
   wherein each fastener comprises a head, a bolt attached to the head, and a nut configured to be tightened onto the bolt to adjust a distance between a rear edge of the main body and the vehicle roof and produce an air gap; and
   an adhesive material disposed between at least one of the brackets and the vehicle roof, thereby firmly attaching and non-invasively securing the main body of the rain guard device on to the vehicle roof.

9. The rain guard system of claim 8, wherein the adhesive material includes at least one of a glue, a fabric glue, an adhesive tape, and a hot glue.

10. The rain guard system of claim 8, wherein the fastener is configured to be tightened for precise adjustment of a distance between the main body and the vehicle roof.

11. The rain guard system of claim 8, wherein the rain guard device is made of a material comprises at least one of polycarbonate, acrylic, polyvinyl chloride, and polyethylene terephthalate glycol.

12. A method for assembling a rain guard system on a vehicle, comprising:
   providing a rain guard device having a main body with one or more openings;
   attaching one or more brackets to the main body of the rain guard device, wherein each bracket has at least one hole aligned with a corresponding opening in the main body, and a top surface of each bracket is configured to create a stable abutment against a bottom surface of the main body, wherein the top surface and the bottom surface exhibit a generally planar configuration;
   securing the rain guard device to a roof of the vehicle through a fastening assembly;
   wherein one or more fasteners in the fastening assembly are inserted through the holes in the brackets and the openings in the main body;
   applying an adhesive material between at least one of the brackets and the vehicle roof such that it firmly attaches the head of each fastener on the vehicle roof; and
   tightening the fasteners to adjust the distance between the rain guard device and the vehicle roof, thereby maintaining a predefined aerodynamic gap.

13. The method of claim 12, wherein the rain guard device comprises a main body in a flat or planar configuration for shielding from precipitation, wherein the main body has at least four edges, at least two surfaces including a top surface and a bottom surface arranged along parallel planes, and one or more through-openings spaced along at least one edge for mechanical coupling to the brackets.

14. The method of claim 12, wherein the adhesive material includes at least one of a glue, a fabric glue, an adhesive tape, and a hot glue.

15. The method of claim 12, wherein the fastener is configured to be tightened for precise adjustment of a distance between a rear edge of the main body and the vehicle roof, the distance being adjustable within a range of 1-2 inches.

* * * * *